JOHN ANSLEY & GEORGE W. ANSLEY.
Improvement in Cultivators.

No. 121,267.  Patented Nov. 28, 1871.

WITNESSES.
Otto Lee Johnson.
Benj. J. Glasgow.

INVENTORS.
John Ansley
George W. Ansley

UNITED STATES PATENT OFFICE.

JOHN ANSLEY AND GEORGE W. ANSLEY, OF MARENGO, MICHIGAN.

IMPROVEMENT IN CULTIVATORS.

Specification forming part of Letters Patent No. 121,267, dated November 28, 1871.

*To all whom it may concern:*

Be it known that we, JOHN ANSLEY and GEORGE W. ANSLEY, both of Marengo, in the county of Calhoun and State of Michigan, have invented certain Improvements in Cultivators, of which the following is a specification:

Our invention relates to the combination of a pair of handles and connected fulcrum-bar with a pair of rocking runners and mounted platform planks furnished with teeth and pole to constitute a cultivator, the handles, bar, and runners aforesaid having such pivoted or jointed connection with each other and platform as to be capable of free vibration in horizontal and vertical planes; the object being to simplify and cheapen the construction by dispensing with all framed work and costly adjusting devices, and at the same time confer increased facilities in adapting the implement to all the various changes required for special use; and, finally, to enable the operator, while his team is in motion, and without changing its line of direction, to lift the cultivator-teeth, or part of them, over an obstacle in the path, or to steer clear of it, by means of an easy manipulation of the handles which serve as levers.

Figure 1:
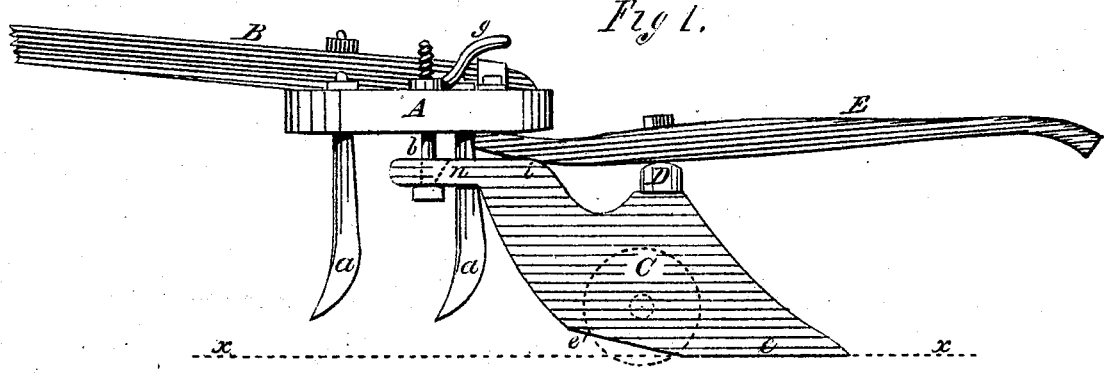
Figure 2:
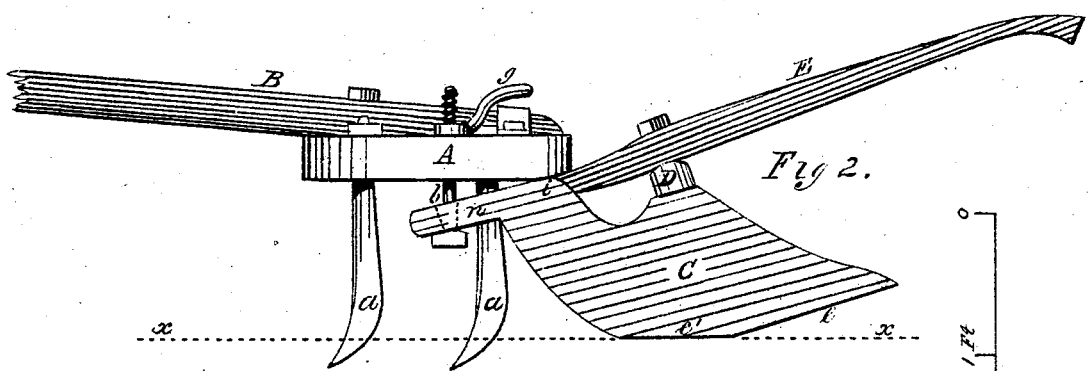
Figure 3:
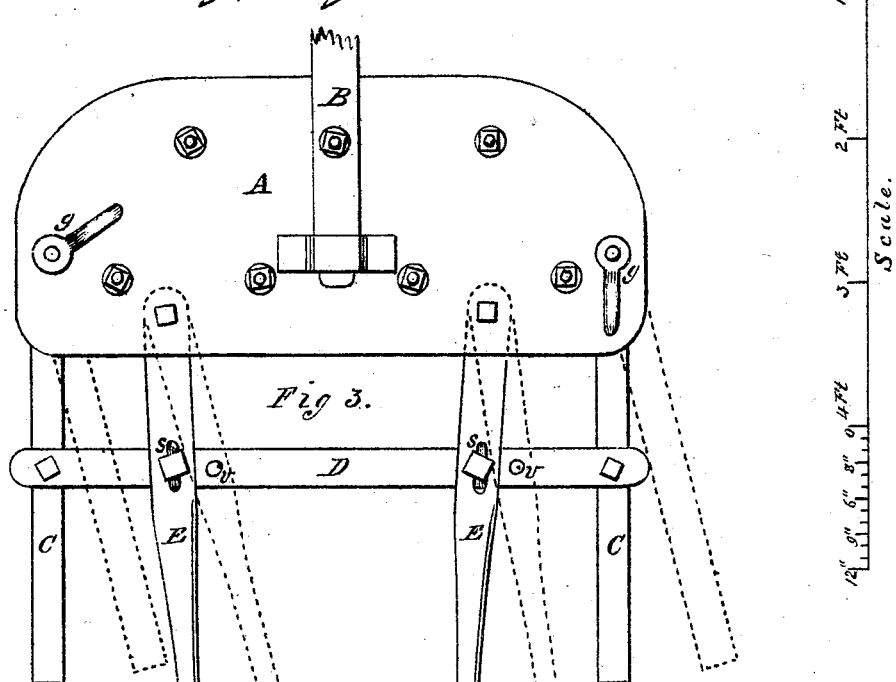

Figure 1 is a side elevation, showing the teeth as lifted above the ground. Fig. 2 is a side elevation, the teeth being shown at working depression. Fig. 3 is a plan or top view.

A is the platform, in which the cultivating-teeth *a a*, &c., arranged in the usual way, are inserted and properly secured. This platform may be made of a single piece of tough hard-wood plank—say three inches in thickness; but if much thinner it would be well to batten it in the diagonal lines of the teeth to act as re-enforcers in steadying them and prevent the splitting of the plank. B is the tongue or pole (broken off) to be adjustably secured on top of the platform in any well-known and proper manner. C C are the rocking runners upon which the platform is mounted, and is secured by the adjusting pivot-bolts *b b*, which manner of mounting and securing will be fully explained hereinafter. The runners are usually made and shaped, substantially as shown, from hard-wood planking, with a neck, as at *n*, extending half-way, or thereabout, across the platform. A bar, D, extends across from runner to runner and rests on their upper edges, to which it is secured by a single pivot-bolt at each end, as shown, said bar being for the purpose of keeping the runners parallel and serving as a fulcrum for the handles to vibrate the runners and raise and lower the platform. E E are the handle-levers pivoted through short slots *s* to the parallel fulcrum-bar D and to the platform at or about the points shown, but in such manner as to permit a limited rocking action on the pivot as well as a turning one. Each runner is secured to the platform near its end by a pivot-bolt, *b*, which passes freely through a hole bored near the end of the runner-neck *n*, and snugly through the body of the platform at or about the points shown.

When the cultivator is to be adjusted for working, the nut must be slackened back and the bolts *b b* driven down enough to permit the runners to rock forward and lower the platform so that its teeth will penetrate the ground to any required depth. In this position the platform will be supported by the runners at the points *i i*, which runners will slide along the ground plane (see dotted line *x x*) on the shoe-lines *e'*, as more clearly seen in Fig. 2, the dotted lines across the neck in Figs. 1 and 2 showing how the bolt-hole is beveled back to allow the runners to rock forward. The operator guides the cultivator by grasping the pivoted lever-handles plow-fashion, and when in motion he steers the cultivator to clear any obstruction by swinging the handles to the right or left, as shown by dotted lines in Fig. 3, which movement, through the agency of the fulcrum-bar D, vibrates both runners to any required diagonal for sheering from and toward the straight course the team is traveling. Should the operator deem it practicable and best to jump the obstacle, he bears down on the handles and rocks back the runners to slide on the shoe-line *e*, as shown in Fig. 1, and if such obstacle should lie in the line of the outside teeth only he may tilt the cultivating-teeth over by only rocking back the runner on that side.

For cultivating corn and other plants in rows the center tooth is removed and the handle-levers are pivoted in the extra hole *v* in the fulcrum-bar on either side, so that the driver may walk clear of the line of growing plants; and when required suitable plows for hilling, &c., may be secured to the platform, instead of the cultivator-teeth removed; and the same may be said of gang-plow cultivation, the proper angle for the line of plows being obtained by securing the pole to the platform A in a suitable diagonal line, for in working the handles and runners can be swung round parallel with the pole.

We regard as advantages not yet alluded to that in our arrangement the team is brought closer up to the working parts and running-gear than in others. The construction is so simple that a farmer with his ordinary tools can readily construct the wood work and put the parts together; and it possesses special facilities for working in stumpy or stony ground, and for adaptation to all kinds of cultivation of the soil.

For traveling to and from the fields the necks of the runners must first be screwed tight up against the platform by turning the lever-nut $g$, which will lift the teeth above the ground; and where the soil is such that the runners will not track well they may be mounted on small wheels hung on studs, as shown by dotted lines in Fig. 1.

We claim as our invention—

The plank platform A carrying the pole B and cultivating-teeth $a\ a\ a$, &c., or equivalent plows, in combination with the runners C C, with or without tracking-wheels, connecting fulcrum-bar D, and handle-levers E E, constructed, connected, and operated substantially in the manner and for the uses set forth.

JOHN ANSLEY.
GEORGE W. ANSLEY.

Witnesses:
OTTO LEE JOHNSON,
BENJ. J. GLASGOW.

(43)